United States Patent
Weinroth

(10) Patent No.: US 8,700,631 B2
(45) Date of Patent: Apr. 15, 2014

(54) TEMPO SPATIAL DATA EXTRACTION FROM NETWORK CONNECTED DEVICES

(75) Inventor: Erez Weinroth, Kfar-Saba (IL)

(73) Assignee: Trendit Ltd., Hod-HaSharon, IL (US)

( * ) Notice: Subject to any disclaimer, the term of this patent is extended or adjusted under 35 U.S.C. 154(b) by 132 days.

(21) Appl. No.: 12/943,971

(22) Filed: Nov. 11, 2010

(65) Prior Publication Data

US 2011/0055216 A1    Mar. 3, 2011

Related U.S. Application Data

(63) Continuation-in-part of application No. PCT/IL2009/000487, filed on May 14, 2009.

(51) Int. Cl.
*G06F 17/30* (2006.01)
*G06F 7/00* (2006.01)

(52) U.S. Cl.
USPC .......................................... 707/740; 709/224

(58) Field of Classification Search
USPC ........ 709/224; 455/411, 418, 435.1; 375/220; 707/740
See application file for complete search history.

(56) References Cited

U.S. PATENT DOCUMENTS

| 6,317,787 B1 * | 11/2001 | Boyd et al. ..................... 709/224 |
| 6,636,742 B1 * | 10/2003 | Torkki et al. ................ 455/456.1 |
| 6,757,545 B2 * | 6/2004 | Nowak et al. ............... 455/456.2 |
| 2001/0036224 A1 * | 11/2001 | Demello et al. .............. 375/220 |
| 2004/0122939 A1 * | 6/2004 | Perkins ......................... 709/224 |
| 2004/0157640 A1 * | 8/2004 | Pirskanen et al. ......... 455/552.1 |
| 2004/0203768 A1 * | 10/2004 | Ylitalo et al. .............. 455/435.1 |
| 2004/0235464 A1 * | 11/2004 | Korkalo et al. .............. 455/418 |
| 2008/0070550 A1 * | 3/2008 | Hose ............................. 455/411 |

OTHER PUBLICATIONS

International Search Report of the International Searching Authority for PCT/IL2009/000487 dated Nov. 11, 2009.
Written Opinion of the International Searching Authority for PCT/IL2009/000487 dated Nov. 11, 2009.
Office Action issued for U.S. Appl. No. 12/365,979 on Jun. 9, 2011.
Office Action issued for U.S. Appl. No. 12/428,073 on Jul. 21, 2011.
Office Action issued for U.S. Appl. No. 12/428,121 on Jul. 14, 2011.

* cited by examiner

*Primary Examiner* — Sathyanarayan Pannala
(74) *Attorney, Agent, or Firm* — Pearl Cohen Zedek Latzer Baratz LLP

(57) ABSTRACT

A computer implemented data processing system for estimating an amount of people situated in a specific location and their geo-demographic classification within time range is provided herein. The system is combined of a collector that is configured to collect data on signals and each signal is given a unique ID; an association module configured to associate each signal with a respective location, namely, place of origin; a processing unit configured to calculate total number of users subscribed to a specific network service provider situated in a specific location and time range; calculate a dynamic ratio by research and statistical data; and an estimation module configured to estimate the amount of people originated from a specific location and the overall amount of people in a location within a time range, by applying the calculated dynamic ratio, that was calculated to each time stamp separately.

16 Claims, 12 Drawing Sheets

| Combined LAC, Cell ID, and Sector ID | Date & Time Stamp | Centroid of the Sector (coordinates) | Total No. of Network-Connected Devices | Class ▲ Profile (Percentage) | Class ■ Profile (Percentage) | Class ⬟ Profile (Percentage) |
|---|---|---|---|---|---|---|
| 310A | 07-07-2008 14:00 | X1, Y1 | 7 | 43% | 14% | 43% |
| 310B | 07-07-2008 14:00 | X1, Y1 | 6 | 33% | 17% | 50% |
| 310C | 07-07-2008 14:00 | X1, Y1 | 6 | 33% | 17% | 50% |
| 310D | 07-07-2008 14:00 | X1, Y1 | 5 | 20% | 20% | 60% |
| 320A | 07-07-2008 14:00 | X2, Y2 | 8 | 12.5% | 37.5% | 50% |
| 320B | 07-07-2008 14:00 | X2, Y2 | 9 | 11% | 56% | 33% |
| 320C | 07-07-2008 14:00 | X2, Y2 | 4 | 25% | 25% | 50% |
| 320D | 07-07-2008 14:00 | X2, Y2 | 11 | 18% | 36% | 46% |
| 330A | 07-07-2008 14:00 | X3, Y3 | 10 | 10% | 50% | 40% |
| 330B | 07-07-2008 14:00 | X3, Y3 | 9 | 33% | 45% | 22% |
| 330C | 07-07-2008 14:00 | X3, Y3 | 7 | 14% | 29% | 57% |
| 330D | 07-07-2008 14:00 | X3, Y3 | 7 | 14% | 43% | 43% |

TEMPO SPATIAL DATA EXTRACTION FROM NETWORK CONNECTED DEVICES

CROSS REFERENCE TO RELATED APPLICATIONS

The present application is a Continuation-In-Part application of International Patent Application No. PCT/IL2009/000487 filed May 14, 2009, which claims priority from U.S. patent application Ser. No. 12/428,073 and No. 12/428,121 both filed on Apr. 22, 2009, each of the two latter being a Continuation-In-Part of U.S. patent application Ser. No. 12/365,979 filed Feb. 5, 2009, which in turn claims priority from U.S. Provisional Patent Application No. 61/053,252 filed on May 15, 2008.

BACKGROUND

1. Technical Field

The present invention relates to the field of network connected devices, and more particularly, to the extraction of data related to users of such networks.

2. Discussion of the Related Art

Prior to setting forth the background of the related art, it may be helpful to set forth definitions of certain terms that will be used hereinafter.

The term "cellular communication network" as used herein in this application, is defined as any network based communication system that is based upon geographical partition of space into cells. Each cell is provided with at least one base station that manages the communication therein. Each cell comprises a plurality of cell sectors, wherein each sector is usually associated with a physical network end point that enables the communication (either wireless or wire-based) with a network-connected device.

The term "User Equipment" (UE) or "network-connected device" as used herein in this application, is any device that is provided with network connectivity, usually over a cellular communication network, and that is uniquely affiliated with a particular user and therefore associated with the particular user related data, or user profile. These network-connected devices may be, but are not limited to: cellular phones, Personal Device Accessories (PDA), portable computers with wireless connectivity (WiFi, WiMax etc.), smart payment card (credit and debit card having a network identifier) and Radio Frequency Identification (RFID) tags.

Traditionally, statistic methods or any large scale marketing research are considered human labor intensive, expensive and extensive, time consuming. Further limitations are that these statistics researches are made with a relative small sample, and non up-to date or non available for small granularity of time-space units. Such obstacles result in an inaccurate space related data with time stamp that highly differ from the transaction time of the database.

U.S. Pat. No. 6,636,742 B1 which is incorporated herein by reference in its entirety discloses a method which utilizes characteristic feature of mobile telephone systems in which the location of the terminal is always known to the system with location area precision and that the geographical network topology is known to the network planning system. The tracing system includes three functional parts: a first part provides the mobile telephone system with the connection number of the traced terminal as an enquiry input, and in response to the input it receives information on where a location area of subscriber should be enquired for. The second functional part asks for the subscriber's location area and receives in response a location area code, which identifies the location area unambiguously. The third functional part searches the location area table for information corresponding with the subscriber's location area and attends to reporting on the results.

Currently, there is no available method for determining how many idle UE from any given network provider were admitted or not admitted and identify their provider affiliation A method is therefore needed to determine and record the number of any idle UE in each cell sector (location area) aggregate by provider code into cellular provider's segments.

BRIEF SUMMARY

According to one aspect of the invention there is provided a computer implemented data processing system for estimating an amount of people situated in a specific location and their geo-demographic classification within time range. The system is combined of a collector that is configured to collect data on signals and each signal is given a unique ID; an association module configured to associate each signal with a respective location, namely, place of origin; a processing unit configured to calculate total number of users subscribed to a specific network service provider situated in a specific location and time range; calculate a dynamic ratio by research and statistical data; and an estimation module configured to estimate the amount of people originated from a specific location and the overall amount of people in a location within a time range, by applying the calculated dynamic ratio, that was calculated to each time stamp separately.

According to another aspect of the invention there is provided a method of extracting users related tempo-spatial data from a cellular network comprising a plurality of cells, each cell comprising at least one cell sector, wherein each cell sector is in communication with a plurality of network-connected devices, and wherein each device is associated with a user profile, the method comprising: identifying all network-connected devices that are both active and idle in each cell sector; combining the identified network-connected devices with corresponding user profile characteristics; and aggregating the combined data according to network-connected devices geographic location, thereby creating anonymous aggregated profiles classes associated with geographical locations, namely, Place Of Origin (POO).

According to yet another aspect of the invention there is provided a computer program product, comprising a computer usable medium having a computer readable program code embodied therein, the computer readable program code adapted to be executed to implement a method of extracting users related tempo-spatial data from a cellular network comprising a plurality of cells, each cell comprising at least one cell sector, wherein each cell sector is in communication with a plurality of network-connected devices, and wherein each device is associated with a user profile, the method comprising: identifying network-connected devices which are both active and idle in each cell sector; combining the identified active network-connected devices with corresponding user profile characteristics; and aggregating the combined data according to network-connected devices geographic location, thereby creating anonymous aggregated profiles classes associated with geographical locations, namely, POO.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings:

FIG. 4 is a chart showing the output of the system and method according to some embodiments of the invention;

Figure 1:
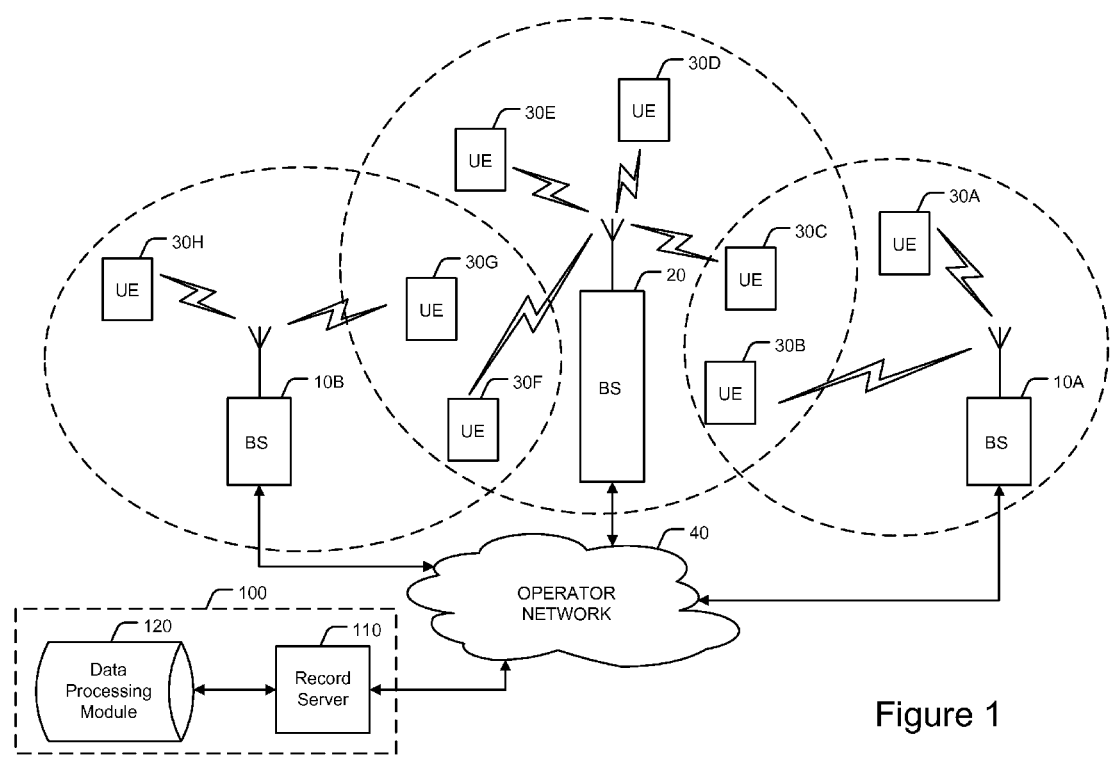
FIG. 1 is a high level schematic block diagram of a cellular communication network in communication with the data processing system according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of a cellular communication network in communication with the data processing system according to some embodiments of the invention. Data processing system 100 comprises a record server 110 and a data processing module 120. Data processing system 100 communicates with cellular network 40 which communicates with a plurality of user equipments (network-connected devices) 30A-30F via a plurality of base stations 10A, 10B and 20.

In operation, data processing system 100 combines and aggregates all Place Of Origin (POO) and profile classes of the data extracted from network-connected devices 30A-30F via the network and in view of the geographic location of the cells, repeatedly over predefined time intervals. Data processing system 100 then interpolates and overlays geo-statistically and calibrates the data into tempo-spatial network-connected users masses patterns representations.

According to some embodiments of the invention, data processing system 100 enables to locate the position of a specific provider (or roaming) User Equipment (UE) and describe it by a tracing system.

According to some embodiments of the invention, data processing system 100 aggregates any camped UE (idle or non idle) in view of geographic locations in order to create tempo-spatial UE masses patterns. Specifically, data processing system 100 is configured in associated operation with any wireless network where UE communicates with a Radio Access Network (RAN). Data processing system 100 determines and records the number of any idle or non idle UE in each cell sector (location area), aggregate the combined data by provider code into cellular provider's segments; aggregates by UE location ("cell sector") centroid [X,Y] coordinates and segments, thereby creating anonymous aggregated masses that has geographical locations. Then, by repeating the aforementioned aggregation with predefined time intervals, data processing system 100 creates tempo-spatial data stamps. Later, data processing system 100 may create, using geo-statistical methods, Geographic Information System (GIS) layers of the aforementioned data.

Figure 2:
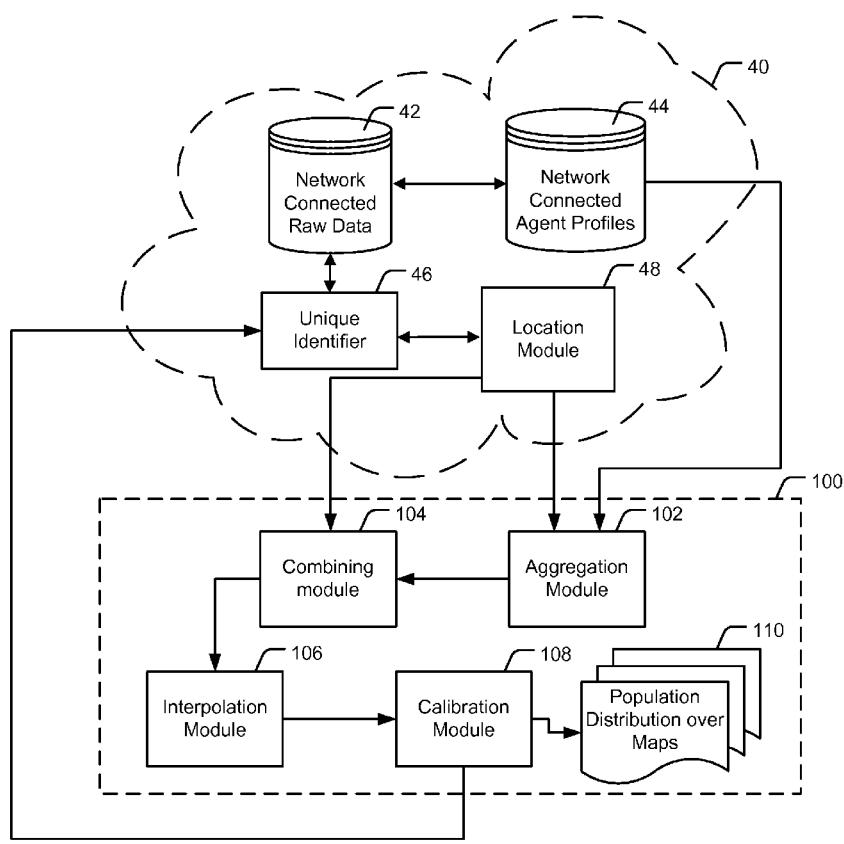
FIG. 2 is a detailed high level schematic block diagram cellular communication network in communication with the data processing system according to some embodiments of the invention.

FIG. 2 is a detailed high level schematic block diagram cellular communication network in communication with the data processing system according to some embodiments of the invention. There is provided a computer implemented data processing system 100 for extracting user related tempo-spatial data from a cellular network 40 comprising a plurality of cells, each cell comprising at least one cell sector, wherein each cell sector is in communication with a plurality of network-connected devices. Each device is associated with a user profile. The system comprises: a computer component aggregation module 102; a computer component combining module 104; a computer component interpolation module 106; and a computer component calibration module 108. Cellular network 40 comprises: a network-connected raw database 42, a network-connected device profiles database 44, a unique identifier 46 and a location module 48.

In operation, aggregation module 102 receives from cellular network 40 combined data exhibiting identified network-connected devices with their corresponding profiles, and aggregates in response, each identified network-connected device with the corresponding location code thereby creating an anonymous aggregated user related data. Combining module 104 combines the aggregated user related data from aggregation module 102 with corresponding geographical coordinates received from location module 48. Interpolating module 106 spatially interpolates the combined aggregated user related data. Calibrating module 108 calibrates the interpolated data with exogamic statistical data.

According to some embodiments of the invention the data processing system further creates tempo-spatial related network-connected devices demographic pattern representations using spatial and temporal geo-statistics techniques. These may include maps 110 exhibiting GIS layers and the like.

According to some embodiments of the invention, the data processing system is further arranged to adjust the demographic pattern representations responsive to client's requirements.

Figure 3:
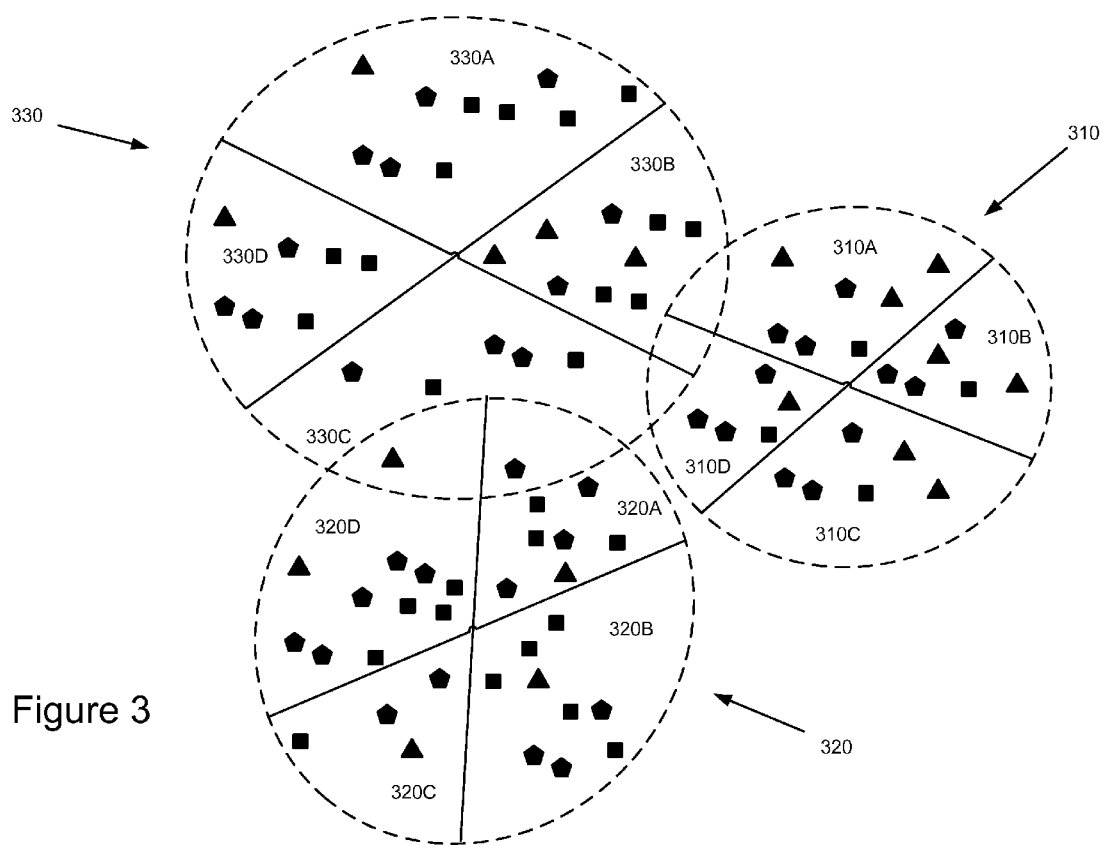
FIG. 3 is a high level high level schematic block diagram of a cellular communication network and network-connected devices according to some embodiments of the invention.

FIG. 3 is a high level high level schematic block diagram of a cellular communication network and network-connected devices according to some embodiments of the invention. Three cells are illustrated: 310, 320, and 330. Each cell is divided into sectors: 310A-D, 320A-D, and 330A-D respectively. Each cell covers a different radius and contains different network-connected devices (although there is some overlapping). Each network-connected device may be associated with a specific profile class. In the non limiting example shown, there are three profile classes; "triangle", "rectangle", and "pentagon", such that their associated network-connected device are distributed.

FIG. 4 is a chart showing the output of the system and method according to some embodiments of the invention. Table 400 showed a potential tempo-spatial stamp showing the distribution of the aforementioned profile classes; "triangle", "rectangle", and "pentagon" of FIG. 3 after the data has been aggregated and combined with geographical location. These tables may be used to generate GIS layers over maps.

Figure 5:
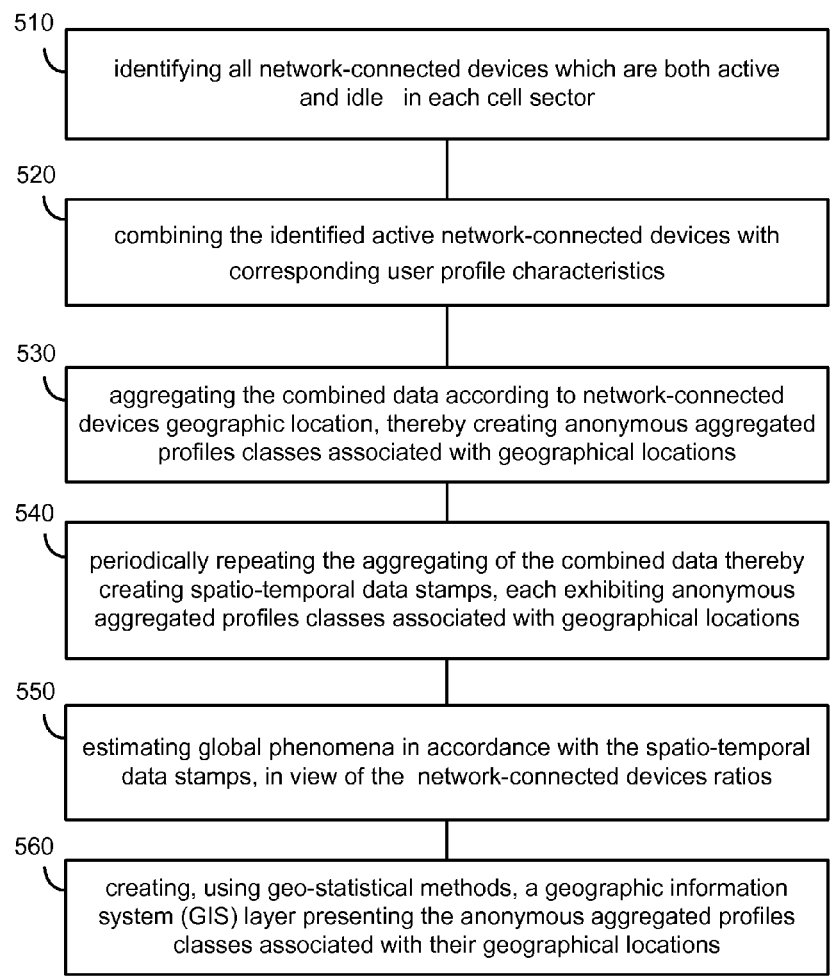
FIG. 5 is a high level flowchart illustrating the method according to some embodiments of the invention.

FIG. 5 is a high level flowchart illustrating the method according to some embodiments of the invention. There is provided a method of extracting users related tempo-spatial data from a cellular network comprising a plurality of cells, each cell comprising at least one cell sector, wherein each cell sector is in communication with a plurality of network-connected devices, and wherein each device is associated with a user profile, the method comprising: identifying all network-connected devices which are both active and idle in each cell sector 510; combining the identified active network-connected devices with corresponding user profile characteristics 520; and aggregating the combined data according to network-connected devices geographic location, thereby creating anonymous aggregated profiles classes associated with geographical locations 530.

According to some embodiments of the invention, the method further comprises periodically repeating the aggregating of the combined data thereby creating tempo-spatial data stamps, each exhibiting anonymous aggregated profiles classes associated with geographical locations;

According to some embodiments of the invention, the method further comprises estimating global phenomena in accordance with the tempo-spatial data stamps, in view of the network-connected devices ratios.

According to some embodiments of the invention, the method further comprising creating, using geo-statistical methods a GIS layer presenting the anonymous aggregated profiles classes associated with geographical locations.

Embodiments of the present invention provides combining customer's group's profiles data derived from the networks CRM with physical network signals and estimated POOs of the corresponding users in order to create spatio-temporal demographic patterns. In embodiments of the invention there is provided combination and aggregation by POOs and customer group's profiles of the data enquired via network-connected device acting as cellular data agents over the end point of the network periodically over predefined time intervals. The raw data is interpolated using geo-statistical method and results are calibrated to create spatio-temporal demographic patterns data sets.

Figure 6:
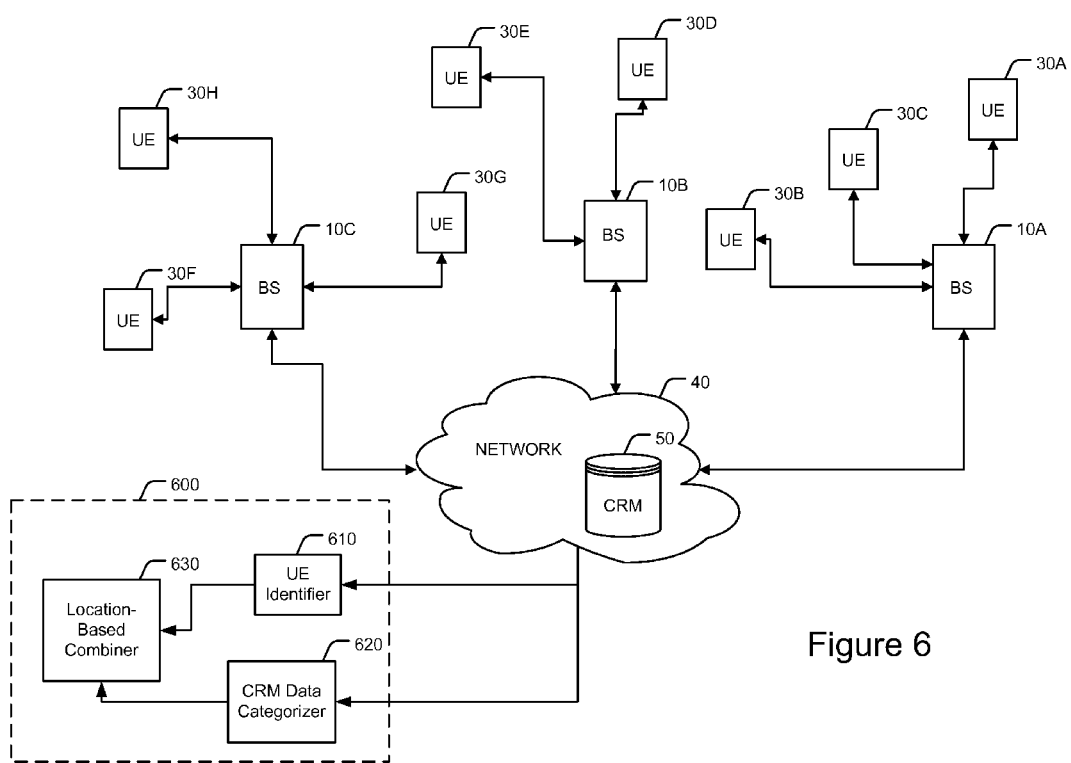
FIG. 6 is a high level schematic block diagram of a cellular network in communication with the data processing system according to some embodiments of the invention.

FIG. 6 is a high level schematic block diagram of a cellular network in communication with the data processing system according to some embodiments of the invention. Data processing system 600 comprises UE identifier 610, a CRM categorizer 620 and a location-based combiner 630. Data processing system 600 communicates with cellular network 40 which communicates with a plurality of user equipments (network-connected devices associated with particular users) 30A-30F via a plurality of base stations 10A, 10B and 10C, being the end points of network 40.

In operation, data processing system 600 combines and aggregates POOs and profiles classes of the data extracted from network-connected devices 30A-30F via the network and in view of the geographic location of the cells, repeatedly over predefined time intervals. Data processing system 600 then interpolates and overlays geo-statistically and calibrates the data into tempo-spatial network-connected users masses patterns representations.

According to some embodiments of the invention, data processing system 600 enables to locate the position of a specific provider (or roaming) UE and describe it by a tracing system.

According to some embodiments of the invention, data processing system 600 aggregates any camped UE (idle or non-idle) in view of geographic locations in order to create tempo-spatial UE masses patterns. Specifically, data processing system 600 is configured in associated operation with any wireless network where UE communicates with a RAN. Data processing system 600 determines and records the number of any idle or non idle UE in each cell sector (location area), aggregate the combined data by provider code into cellular provider's segments; aggregates by UE location area coordinates and segments, thereby creating anonymous aggregated masses that has geographical locations. Then, by repeating the aforementioned aggregation with predefined time intervals, data processing system 600 creates tempo-spatial data stamps. Later, data processing system 600 may create, using geo-statistical methods, GIS layers of the aforementioned data.

In many user-based networks, upon connection to a network, the identity of a network-connected device must be authenticated for data security reasons. In Global System for Mobile Communications (GSM), for example, the authentication process is based on a challenge response process, wherein the network sends the Subscriber Identity Module (SIM) installed in the user equipment a random challenge. The user equipment replies with a response according to calculations based on the random challenge and a secret key known only by the authentication center of the network and the SIM. The response of the random challenge and the secret key is calculated in the authentication center also. If the responses calculated by the SIM and the authentication center are identical, mobile subscriber authenticity has been established by the authentication process.

According to the present invention, there is provided a method of determining the number of idle user equipment units in each cell. The focus is specifically on idle user equipment units as these units are updating their POO in predefined intervals, while user equipment units which are both active and idle are constantly updating thus creating multiple signaling that has to be ignored. Embodiments of the present invention provide a method of counting the idle user equipment units in any cell taking into account the POO update and the constant inflow and out flow of users in regards to each particular cell. In GSM, for example, Location Update (LU) strategy can handle all the cell phones which have been turned on and in idle status and all the cells within the GSM network are grouped into a number of disjointed Location Areas (LA).

Usually, there are three reasons which can cause one new LU record, and the information can be obtained from an interface of cellular network: A cell phone updates its location once it enters another new location area from the old location area, and it is termed as Static Location Update (SLU); A cell phone updates its location periodically every pre-specified time interval, and the time period is determined by the wireless carriers, and it is termed as Timer-based Location Update (TLU); A cell phone updates its location when it ends its on-going call after traversing the boundary of location area, or turns on cell phone, or sends a short message.

Figure 7:
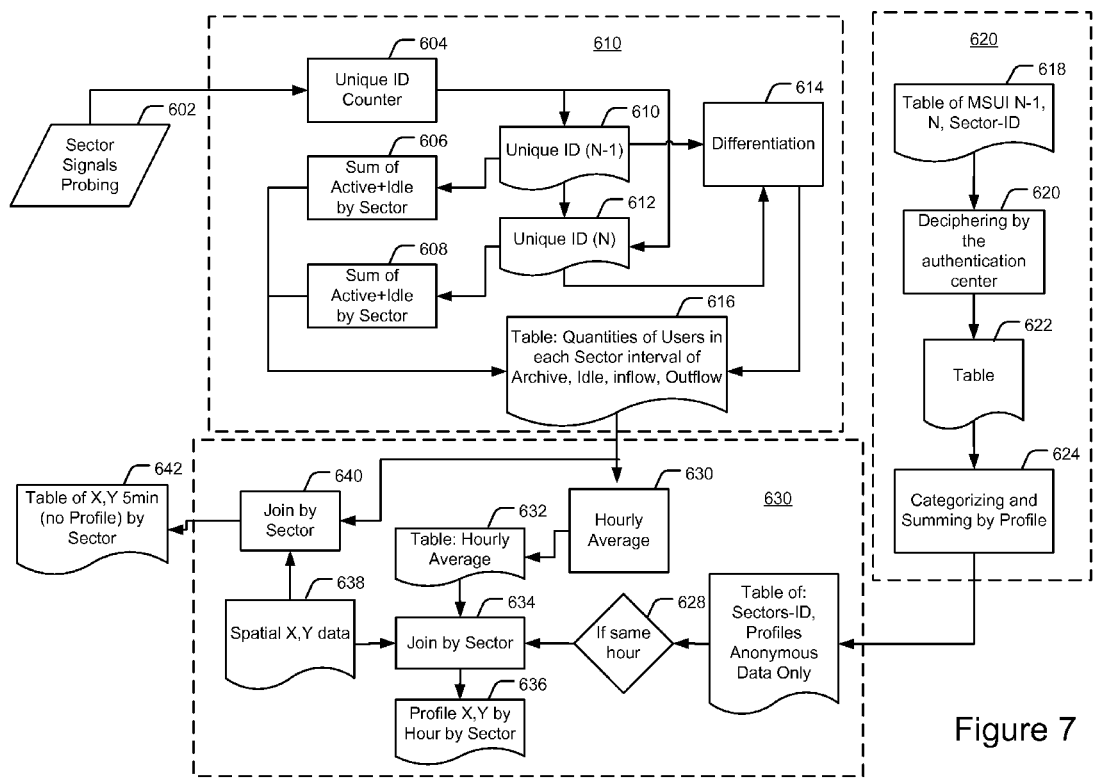
FIG. 7 is a high level collected data flow diagram and block diagram according to some embodiments of the invention.

FIG. 7 is a high level combined data flow diagram and block diagram showing how unique identifiers of user equipment from the CRM is used to create aggregated geo statistical presentation of the users in a given cellular network. There is provided a computer implemented data processing system for using CRM data exhibiting unique user identifiers in a cellular network comprising a plurality of location areas and further in operative association with network-connected devices associated with users, for creating geo-statistical representations of the users. The system comprising: a network-connected devices identifier 610; a CRM data categorizer 620; and a location-based combiner 630.

In operation, network-connected devices identifier 610 is arranged to: repeatedly identify, every a first time period, all network-connected devices which are both active and idle in each location area using the unique identifier; repeatedly create a table, every a second time period comprising a plurality of the first time period, for all location areas, each table exhibiting: location area identifier, unique user identifier, time of inflow to the location area, time of outflow from the location area; and differentiate table of time N−1 over table of time N thereby detecting inflow outflow quantities of unique identifiers for each location area; and wherein the CRM data categorizer is arranged to: decipher the difference table by the authentication center of the network; and analyze the deciphered tables using CRM profiles. The location-based combiner is further arranged to join over time, the deciphered tables with corresponding location area thereby creating at least one GIS data layer.

According to some embodiments of the invention, the analyzing the deciphered tables using CRM profiles is preceded by categorizing and summing the CRM data by user profiles.

According to some embodiments of the invention, the analyzing the deciphered tables using CRM profiles is conducted such that properties of a particular area are used to deduce further information in relation to the users located in the particular location area.

According to some embodiments of the invention, analyzing the deciphered tables using CRM profiles is conducted such that properties of a particular categorized user profile are used to deduce further information in relation to the particular location area in which the users are located.

According to some embodiments of the invention, the data processing system further creates tempo-spatial related network-connected devices demographic pattern representations using spatial and temporal geo-statistics techniques. These may include maps exhibiting GIS layers and the like.

According to some embodiments of the invention, the data processing system is further arranged to adjust the demographic pattern representations responsive to client's requirements.

Figure 8:
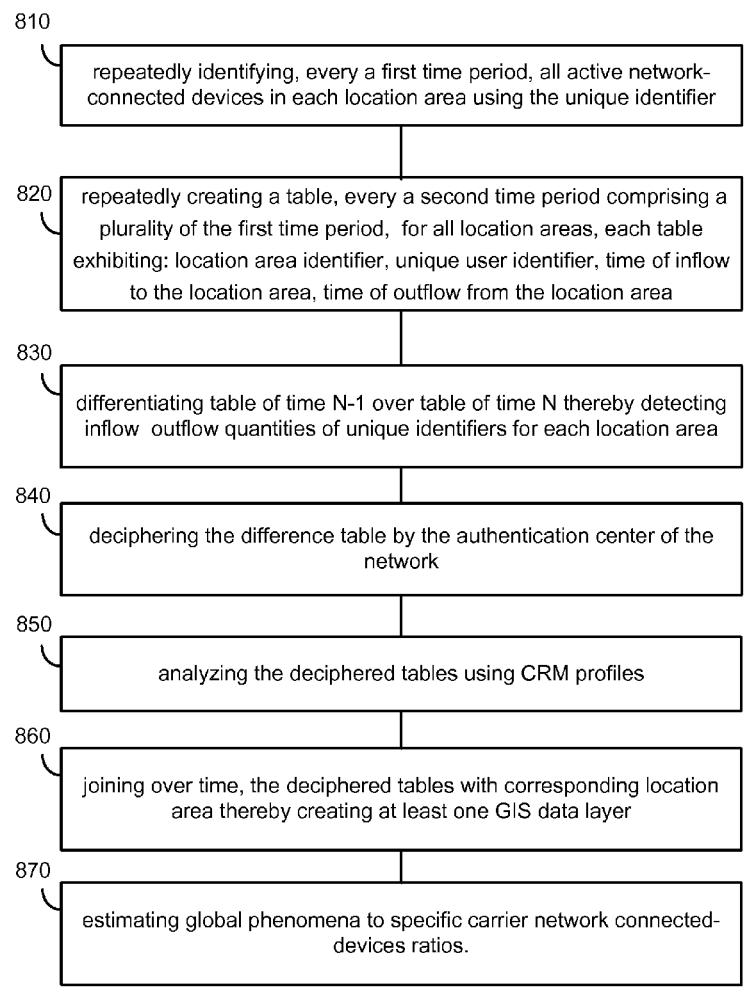
FIG. 8 is a high level flowchart illustrating a method according to some embodiments of the invention.

FIG. 8 is a high level flowchart illustrating the method according to some embodiments of the invention. There is provided a method of using customer relationship management data exhibiting unique user identifiers in a cellular network comprising a plurality of location areas and further in operative association with network-connected devices associated with users, for creating geo-statistical representations of the users. The method comprising: repeatedly identifying, every a first time period, all network-connected devices which are both active and idle in each location area using the unique identifier 810; repeatedly creating a table, every a second time period comprising a plurality of the first time period, for all location areas, each table exhibiting: location area identifier, unique user identifier, time of inflow to the location area, time of outflow from the location area 820; differentiating table of time N−1 over table of time N thereby detecting inflow outflow quantities of unique identifiers for each location area 830; deciphering the difference table by the authentication center of the network; analyzing the deciphered tables using CRM profiles 840; analyzing the deciphered tables using CRM profiles 850; joining over time, the deciphered tables with corresponding location area thereby creating at least one GIS data layer 860; and estimating global phenomena to specific carrier network connected-devices ratios 870.

Figure 9:
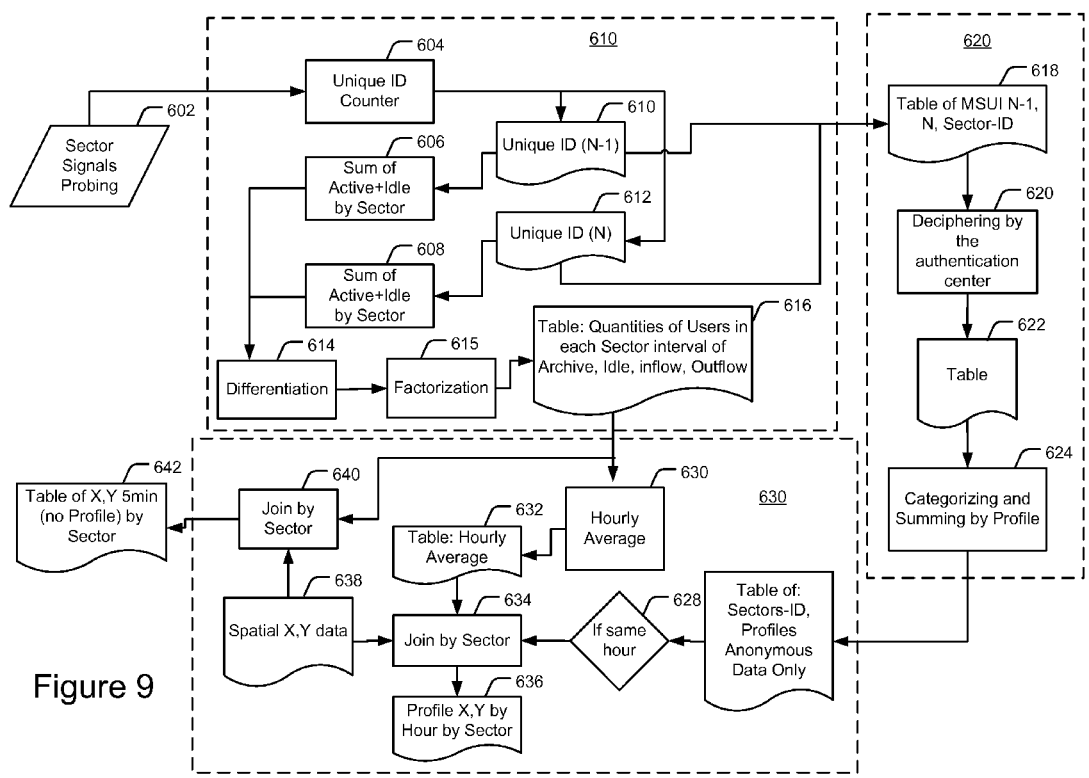
FIG. 9 is a high level combined data flow diagram and block diagram according to some embodiments of the invention.

FIG. 9 is a high level combined data flow diagram and block diagram showing how unique identifiers of user equipment from the CRM is used to create aggregated geo statistical presentation of the users in a given cellular network. There is provided a computer implemented data processing system for using CRM data exhibiting unique user identifiers in a cellular network comprising a plurality of location areas and further in operative association with network-connected devices associated with users, for creating geo-statistical representations of the users. The system comprising: a network-connected devices identifier 610; a CRM data categorizer 620; and a location-based combiner 630.

In operation, network-connected devices UE identifier 610 is arranged to: repeatedly identify, every a first time period, all active network-connected devices in each location area using the unique identifier; repeatedly create a table, every a second time period comprising a plurality of the first time period, for all location areas, each table exhibiting: location area identifier, unique user identifier, time of inflow to the location area, time of outflow from the location area; and differentiate table of time N−1 over table of time N thereby detecting inflow outflow quantities of unique identifiers for each location area.

As the unique user identification is not provided by the CRM data, differentiation is made between N−1 and N time intervals tables in order to find the inflow and outflow quantities of unique identification for each geographical area. According to some embodiments of the invention, the differentiation is followed by a factorization utilizing statistics of network-connected devices activity. Specifically, factors coefficients are calculated in view of the LU/TLU the number of idle cellular agents in each sector using the following equation:

$$X_{in} = Idl_i * \frac{\left(T - \sum_{i=1}^{N} A_i - \sum_{i=1}^{N} Idl_i\right)}{\sum_{i=1}^{N} Idl_i} \quad (1)$$

Wherein in the aforementioned equation (1), Ai denotes the number of active network-connected devices in a geographical area I totaling in N, T denotes the total number of network-connected devices of a particular cellular network operator multiplied by a factor compensating for offline network-connected devices, and $Idl_i$ denotes the number of idle network-connected devices who performed a LU/TLU in geographical area I. Thus $X_{in}$ yields the estimated number of idle network-connected devices in sectors i by time sample n.

Advantageously, the aforementioned statistical factorization enables the analysis of CRM data not exhibiting unique identifies for extracting tempo-spatial information regarding the users of a network.

Further, CRM data categorizer 620 is arranged to: decipher the difference table by the authentication center of the network; and analyze the deciphered tables using CRM profiles. The location-based combiner is further arranged to join over time, the deciphered tables with corresponding location area thereby creating at least one GIS data layer.

According to some embodiments of the invention, the analyzing the deciphered tables using CRM profiles is preceded by categorizing and summing the CRM data by user profiles.

According to some embodiments of the invention, the analyzing the deciphered tables using CRM profiles is conducted such that properties of a particular area are used to deduce further information in relation to the users located in the particular location area.

According to some embodiments of the invention, analyzing the deciphered tables using CRM profiles is conducted such that properties of a particular categorized user profile are used to deduce further information in relation to the particular location area in which the users are located.

According to some embodiments of the invention, the data processing system further creates tempo-spatial related network-connected devices demographic pattern representations using spatial and temporal geo-statistics techniques. These may include maps exhibiting GIS layers and the like.

According to some embodiments of the invention, the data processing system is further arranged to adjust the demographic pattern representations responsive to client's requirements.

Figure 10:
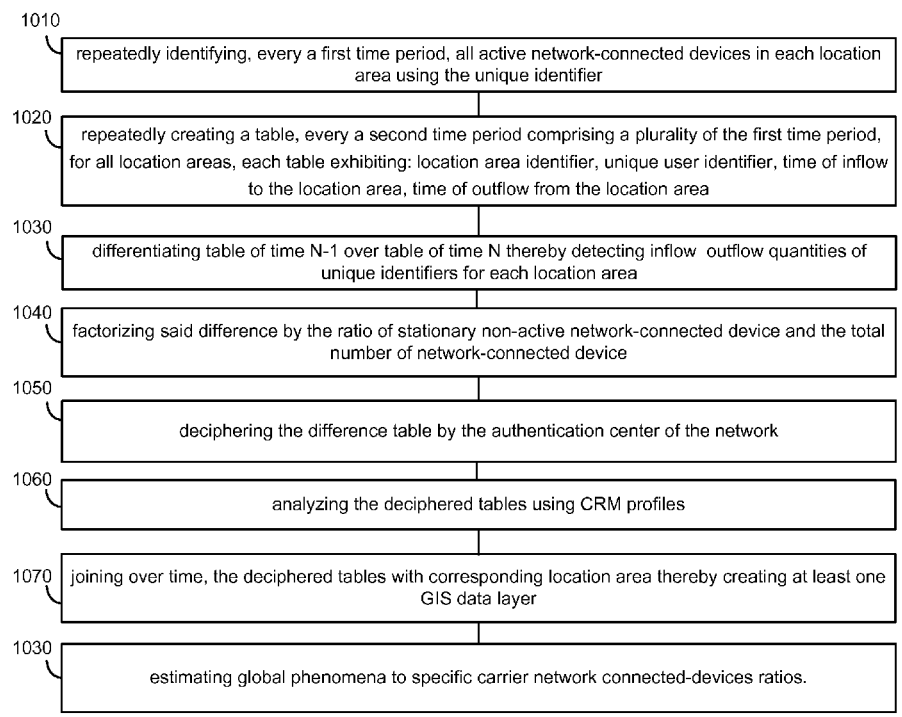
FIG. 10 is a high level flowchart illustrating a method according to some embodiments of the invention.

FIG. 10 is a high level flowchart illustrating the method according to some embodiments of the invention. There is provided a method of using customer relationship management data exhibiting unique user identifiers in a cellular network comprising a plurality of location areas and further in operative association with network-connected devices associated with users, for creating geo-statistical representations of the users. The method comprising: repeatedly identifying, every first time period, all active network-connected devices in each location area using the unique identifier 1010; repeatedly creating a table, every second time period comprising a plurality of the first time period, for all location areas, each table exhibiting: location area identifier, time of inflow to the location area, time of outflow from the location area 1020; differentiating table of time N-1 over table of time N thereby detecting inflow outflow quantities of unique identifiers for each location area 1030; factorizing said difference by the ratio of stationary non-active network-connected device and the total number of network-connected devices 1040; deciphering the difference table by the authentication center of the network; analyzing the deciphered tables using CRM profiles 1050; analyzing the deciphered tables using CRM profiles 1060; joining over time, the deciphered tables with corresponding location area thereby creating at least one GIS data layer 1070; and estimating global phenomena to specific carrier network connected-devices ratios 1080.

Figure 11:
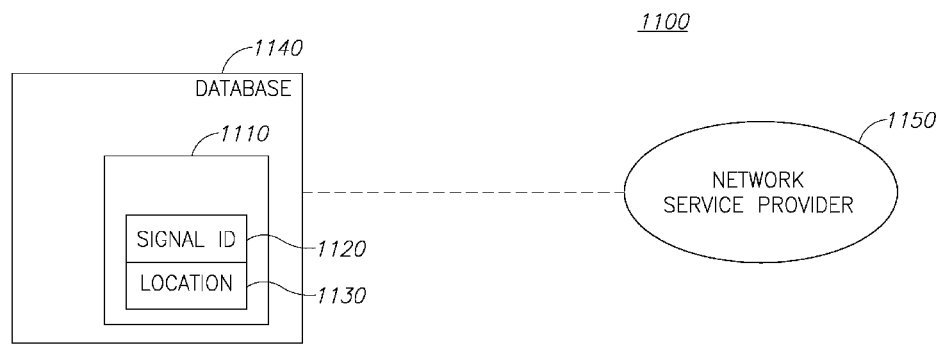
FIG. 11 a high level schematic block diagram of data on signals collection stored on network service provider database.

FIG. 11 is a high level schematic block diagram of data on signals 1110 collection stored on database 1140 correlated with a network service provider 1150. Each signal ascribed a unique ID 1120 and location 1130. The location 1130 is ascribed to each detected unique ID 1120 and saved in a database structure. The location ascribed to each detected unique ID 1120 is determined by the median number the signal transmitted from the location over a specified period of time. For example, over a month between 12:00 am and 06:00 am.

Figure 12:
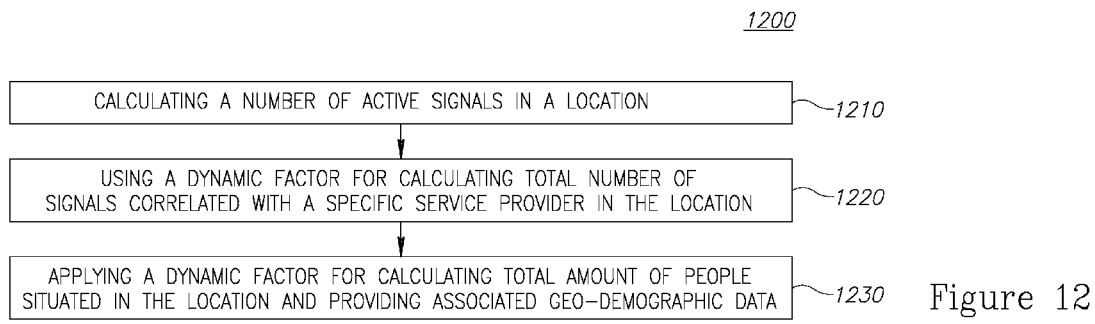
FIG. 12 is a high level flowchart illustrating two steps for calculating total amount of people situated in a location.

FIG. 12 is a high level flowchart illustrating a process to calculate total amount of people situated in a location within a time range and their geo-demographic classification. Calculating a number of active signals in a location (stage 1210); then, using a dynamic factor for calculating total number of signals correlated with a specific service provider in the location (stage 1220); Applying a dynamic factor for calculating total amount of people situated in the location and providing associated geo-demographic classification (stage 1230).

Figure 13:
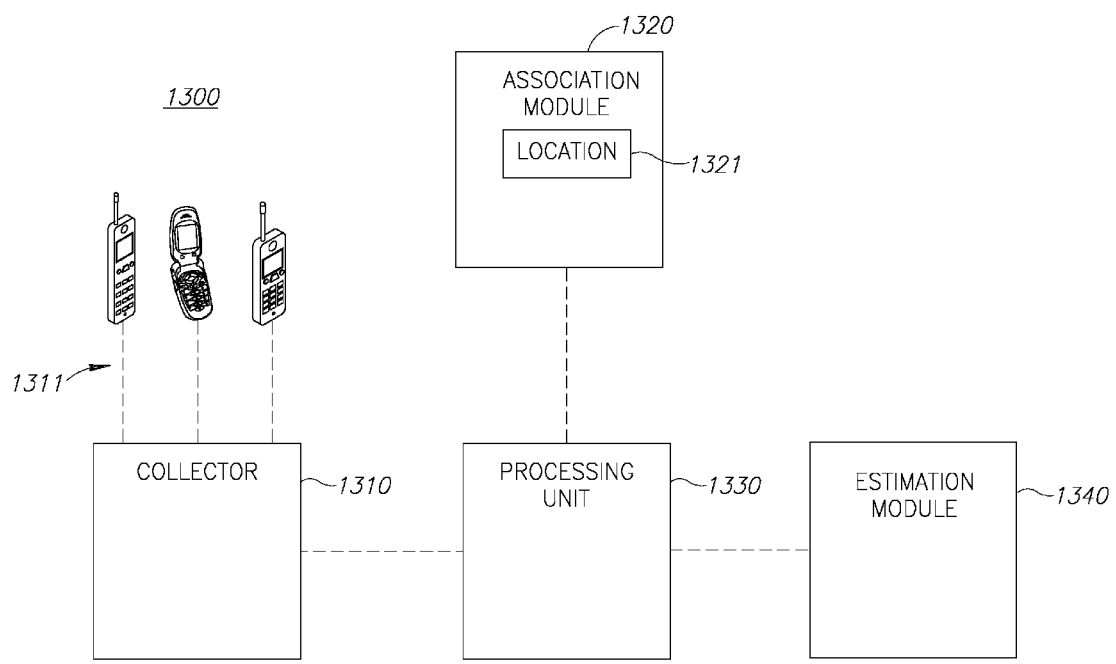
FIG. 13 is a block diagram illustrating a system that calculates total amount of people situated in a location within a time range and their geo-demographic classification.

FIG. 13 is a block diagram illustrating a system 1300 that calculates total amount of people situated in a location within a time range and their geo-demographic classification. A collector 1310 configured to collect data on signals 1311 that are broadcasted by a network service provider over time, wherein each signal is given a unique ID; An association module 1320 configured to associate each signal with a respective location 1321, based on calculated median number of transmissions of detected signals in a specified location in a specified period of time; A processing unit 1330 configured to: (a) calculate total number of users subscribed to a specific network service provider situated in a specific location and time range; and (b) calculate a dynamic ratio by research and statistical data, between (i) the number of users of a specific network service provider situated in a specified location and time range originated in a specific location and (ii) a number of people originated in a specific location; and An estimation module 1340 configured to estimate the amount of people originated from a specific location and the overall amount of people in a location within a time range, by applying the calculated dynamic ratio, that was calculated to each time stamp separately.

Advantageously, embodiments of the present invention enable: estimation near real time update ratios, space and time related demographic pattern data and a uniform and repeatable method for acquiring data over wide areas. Additionally the embodiments provide a method of overcoming large amounts of data signaling processing without slowing the cellular network system and a method of extracting demographic data in a non pervasive way to be used in demographic analysis, marketing, network optimization and visualization.

The availability of near real time aggregate data for real units e.g. cells sectors (or any geographically define hot spots) enable the creation of maps and databases relate to network-connected devices distribution estimation, with high granularity of time-space units.

According to some embodiments of the invention, the method further comprises periodically repeating the aggregating of the combined data thus, creating tempo-spatial data stamps, each exhibiting anonymous aggregated profiles classes associated with geographical locations, namely POOs.

According to some embodiments of the invention, the method further comprises estimating global phenomena in accordance with the tempo-spatial data stamps, in view of the network-connected devices ratios.

According to some embodiments of the invention, the method, further comprising creating, using geo-statistical methods a GIS layer presenting the anonymous aggregated profiles classes associated with geographical locations, namely, POOs.

Advantageously, embodiments of the present invention provide non-pervasive sampling method and data processing system enabling to identify and relate customer into a predefined group profiles without overloading the network signaling flow.

Advantageously, the data processing system, computer implemented method and computer program described herein may be used in demographic analysis, marketing, cellular provider network optimization and visualization and combining cellular devices data records with GIS and statistical process.

Advantageously, the availability of up-to-date aggregated data for real units e.g. cells sectors (any geographically define hot spots) enable the creation of maps and databases related to provider's market share distribution estimation exhibiting high granularity of time-space units.

The availability of up-to-date aggregate data for real units e.g. cells sectors (any geographically define hot spots) enable the creation of maps and databases relate to network connected devices (population) distribution estimation with high granularity of time-space units.

Advantageously, use any network related system provider that can locate geographically a device and aggregate the data related to the device by tempo-spatial patterns. Examples for such alternatives can be: ATMs tempo-spatial patterns activity and distribution of active TV at home by place and time of the day.

According to some embodiments of the invention, the system can be implemented in digital electronic circuitry, or in computer hardware, firmware, software, or in combinations thereof.

Suitable processors may be used to implement the data processing system, computer implemented method and computer program product. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of nonvolatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

Consistent with other embodiments of the present invention, there is provided a method of calculating an estimated amount of people situated in a specific location and provide their geo-demographic classification.

According to some embodiments, the method may include the following stages: running a process named "event location" to collect data on signals broadcasted by a network service provider over time, such that the signals ascribed a unique ID and a location which is POO. For each signal a dynamic factor is calculated by its respective location and initial values such as land usage, that are provided by a third party.

What is claimed is:

1. A data processing system for estimating an amount of people in a specific location and their geo-demographic classification, the data processing system comprising:
   a collector configured to collect data broadcasted by a network service provider over time, the data exhibiting unique user identifiers corresponding with the user profiles of the network connected devices, wherein each network connected device has a unique user identifier;
   an association module configured to associate broadcasted data with respective location area, based on calculated median number of transmissions in a specified location area in a specified period of time;
   a network-connected devices identifier configured to:
      repeatedly identify, every a first time period, all network-connected devices which are both active and idle in each location area;
      repeatedly create a table, every a second time period comprising a plurality of the first time period, for all location areas, each table exhibiting: location area identifier, unique user identifier, time of inflow to the location area, time of outflow from the location area; and
      differentiate table of time N-1 over table of time N thereby detecting inflow and outflow quantities of unique user identifiers for each location area;
   a client relationship management (CRM) data categorizer configured to:
      decipher the difference table by an authentication center of the network; and
      analyze the deciphered tables using CRM profiles;
   a processing unit configured to:
      (a) calculate total number of users subscribed to a specific network service provider situated in a specific location area and time range; and
      (b) calculate a dynamic ratio by research and statistical data, between (i) the number of users of a specific network service provider situated in a specified location area and time range originated in a specific location area and (ii) a number of people originated in a specific location area;
   a location-based combiner configured to join over time quantities of unique user identifiers in each location area analyzed by corresponding CRM profiles, thereby creating geo-demographic classifications associated with location areas, wherein the location-based combiner is configured to join over time, the deciphered tables with corresponding location area thereby creating at least one Geographic Information System (GIS) data layer; and
   an estimation module configured to estimate the amount of people originated from a specific location area and the overall amount of people in a location area associated with said geo-demographic classification within a time range, by applying the calculated dynamic ratio, that was calculated to each time stamp separately.

2. The data processing system according to claim 1, further comprising a combining module, and wherein the combining module combines aggregated user related data from with corresponding geographical coordinates.

3. The data processing system according to claim 2, further comprising an interpolating module and wherein the interpolating module spatially interpolates the combined aggregated user related data.

4. The data processing system according to claim 3, further comprising a calibrating module, and wherein the calibrating module calibrates the interpolated data with exogamic statistical data.

5. The data processing system according to claim 4, wherein the data processing system creates tempo-spatial related network-connected devices masses pattern representations using spatial and temporal geo-statistics techniques.

6. The data processing system according to claim 1, wherein the location-based combiner is further arranged to estimate global phenomena to specific carrier network connected-devices ratios.

7. The data processing system according to claim 1, wherein the CRM data categorizer analyzes the deciphered tables using CRM profiles by categorizing and summing the CRM data by user profiles.

8. The data processing system according to claim 1, wherein the CRM data categorizer analyzes the deciphered tables using CRM profiles is conducted such that properties of a particular area are used to deduce further information in relation to the users located in the particular location area.

9. The data processing system according to claim 1, wherein the CRM data categorizer analyzes the deciphered tables using CRM profiles such that properties of a particular categorized user profile are used to deduce further information in relation to the particular location area in which the users are located.

10. A system of estimating an amount of people in a specific location and their geo-demographic classification, the system comprising a processor, the processor configured to:
   collect data broadcasted by a network service provider over time, the data exhibiting unique user identifiers corresponding with the user profiles of the network connected devices, wherein each network connected device has a unique user identifier;
   collect broadcasted data with respective location area, based on calculated median number of transmissions in a specified location area in a specified period of time;
   repeatedly identify, every a first time period, all network-connected devices which are both active and idle in each location area;
   repeatedly create a table, every a second time period comprising a plurality of the first time period, for all location areas, each table exhibiting: location area identifier, unique user identifier, time of inflow to the location area, time of outflow from the location area;
   differentiate table of time N-1 over table of time N thereby detecting inflow and outflow quantities of unique user identifiers for each location area;
   decipher the difference table by an authentication center of the network;
   analyze the deciphered tables using client relationship management (CRM) profiles;

calculate total number of users subscribed to a specific network service provider situated in a specific location area and time range;

calculate a dynamic ratio by research and statistical data, between (i) the number of users of a specific network service provider situated in a specified location area and time range originated in a specific location area and (ii) a number of people originated in a specific location area;

join over time quantities of unique user identifiers in each location area analyzed by corresponding CRM profiles, thereby creating geo-demographic classifications associated with said each location area, comprising joining over time the deciphered tables with corresponding location area thereby creating at least one Geographic Information System (GIS) data layer; and estimate the amount of people originated from a specific location area and the overall amount of people in a location area associated with said geo-demographic classification within a time range, by applying the calculated dynamic ratio, that was calculated to each time stamp separately.

11. The system according to claim 10, wherein the processor is further configured to periodically repeat the aggregating of the collected data thereby creating tempo-spatial data stamps, each exhibiting anonymous aggregated profiles classes associated with geographical locations.

12. The system according to claim 11, wherein the processor is further configured to estimate global phenomena in accordance with the tempo-spatial data stamps, in view of the network-connected devices ratios.

13. The system according to claim 10, wherein the processor is further configured to create, using geo-statistical methods, a GIS layer presenting the anonymous aggregated profiles classes associated with geographical locations.

14. A non-transitory computer usable medium having a computer readable program code embodied therein, wherein execution of the code by a computer causes the computer to perform a method of estimating an amount of people in a specific location and their geo-demographic classification, the method comprising:

collecting data broadcasted by a network service provider over time, the data exhibiting unique user identifiers corresponding with the user profiles of the network connected devices, wherein each network connected device has a unique user identifier;

associating broadcasted data with respective location area, based on calculated median number of transmissions in a specified location area in a specified period of time;

repeatedly identifying, every a first time period, all network-connected devices which are both active and idle in each location area;

repeatedly creating a table, every a second time period comprising a plurality of the first time period, for all location areas, each table exhibiting: location area identifier, unique user identifier, time of inflow to the location area, time of outflow from the location area;

differentiating table of time N−1 over table of time N thereby detecting inflow and outflow quantities of unique user identifiers for each location area;

deciphering the difference table by an authentication center of the network;

analyzing the deciphered tables using client relationship management (CRM) profiles;

calculating total number of users subscribed to a specific network service provider situated in a specific location area and time range;

calculating a dynamic ratio by research and statistical data, between (i) the number of users of a specific network service provider situated in a specified location area and time range originated in a specific location area and (ii) a number of people originated in a specific location area;

joining over time quantities of unique user identifiers in each location area analyzed by corresponding CRM profiles, thereby creating geo-demographic classifications associated with said each location area, comprising joining over time the deciphered tables with corresponding location area thereby creating at least one Geographic Information System (GIS) data layer; and estimating the amount of people originated from a specific location area and the overall amount of people in a location area associated with said geo-demographic classification within a time range, by applying the calculated dynamic ratio, that was calculated to each time stamp separately.

15. The computer usable medium according to claim 14, wherein the method further comprising periodically repeating aggregating of the collected data thereby creating tempo-spatial data stamps, each exhibiting anonymous aggregated profiles classes associated with geographical locations.

16. The computer usable medium according to claim 15, wherein the method further comprising estimating global phenomena in accordance with the tempo-spatial data stamps, in view of the network-connected devices ratios.

* * * * *